United States Patent Office 3,357,104
Patented Dec. 12, 1967

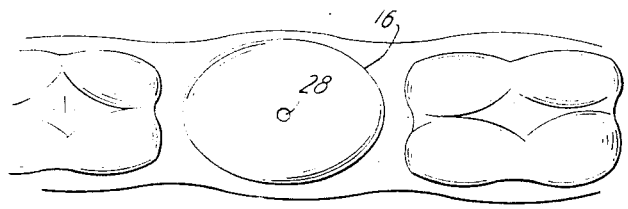
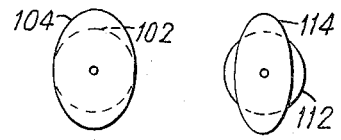
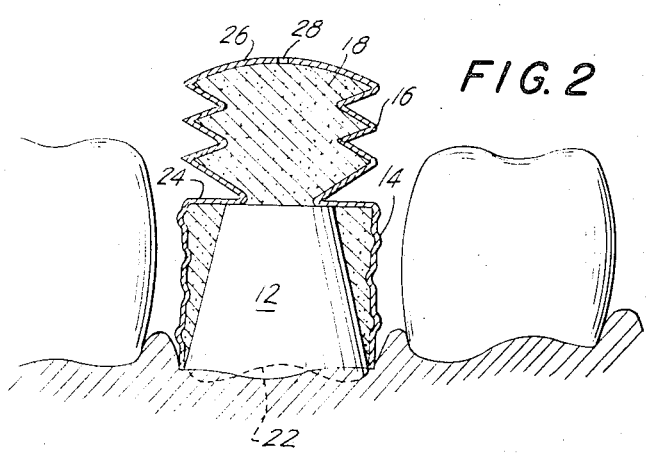
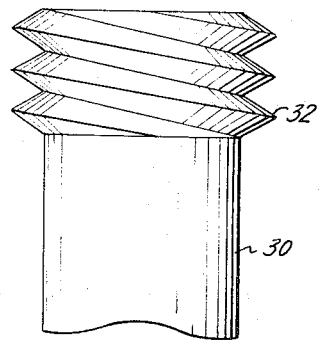
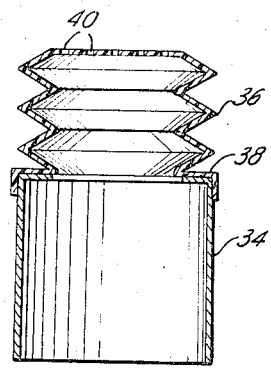
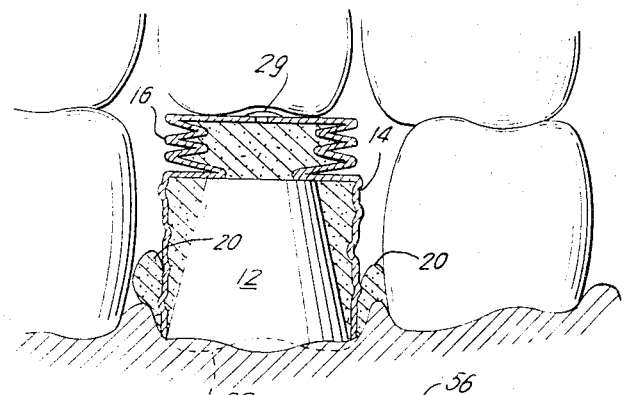
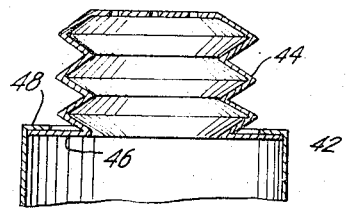
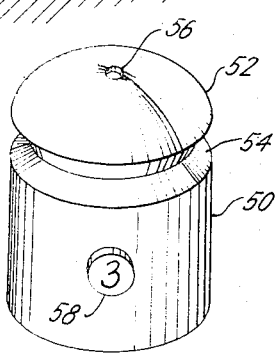
INVENTORS
LOUIS L. GREENE
NORMAN A. GREENE
BY
James and Franklin
ATTORNEYS

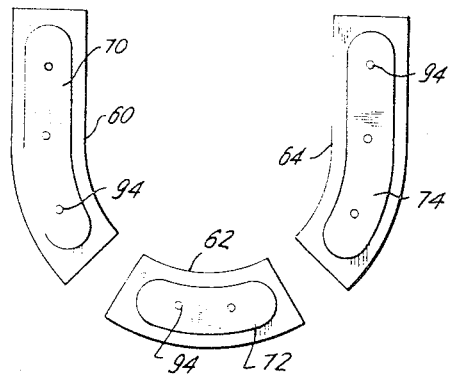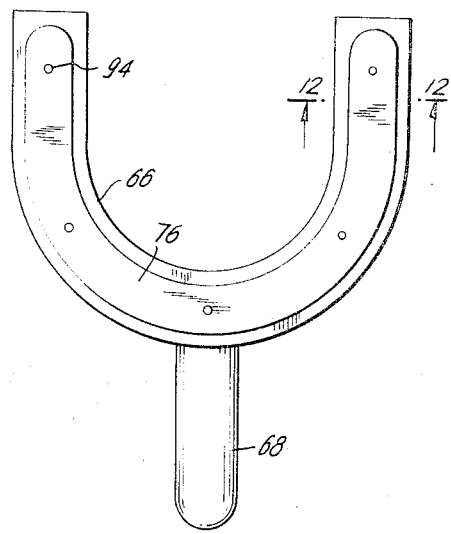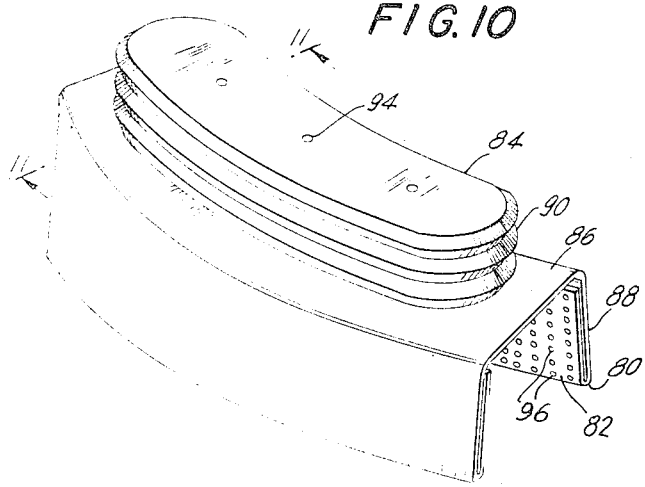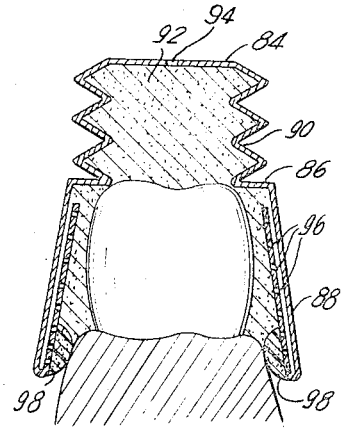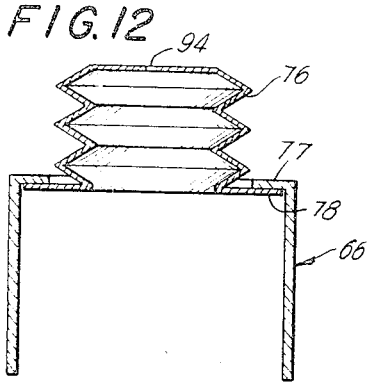
INVENTORS
LOUIS L. GREENE
NORMAN A. GREENE

3,357,104
DENTAL IMPRESSION HOUSING
Louis L. Greene, 14 Woodland Place, Great Neck, N.Y. 11021, and Norman A. Greene, 154 Highridge Road, New Rochelle, N.Y. 10804
Filed May 21, 1965, Ser. No. 457,646
18 Claims. (Cl. 32—17)

ABSTRACT OF THE DISCLOSURE

The dental impression cup receives impression material to make an imprint of a tooth prepared to receive a crown or inlay. The improved cup has a compressible bellows forming an upward extension at the top, this being made of thin readily bendable material, and being downwardly compressible to force the impression material downward. The top of the bellows is closed, but may have a vent hole. The bellows feature is also applicable to a dental impression tray.

---

This invention relates to dentistry, and more particularly to dental impression cups and trays, hereinafter generically referred to as impression "housings."

A dental impression cup is designed to receive impression materials for the purpose of making an exact imprint of a prepared tooth, as for a crown or an inlay, from which a model of the prepared tooth can be formed. The usual dental impression band or cup is a thin metal cylinder, open or closed at the top, and made of a suitable soft metal such as copper or aluminum.

With the introduction of the elastomeric dental impression materials such as the silicones, thiokol rubbers, alginates, etc., the usual dental cup has not afforded sufficient pressure for forcing the dental material into all the desired areas of the prepared cavity or tooth surfaces. An inaccurate or incomplete impression may result because there is insufficient displacement of entrapped air and oral fluids. One object of our improvement is to overcome this difficulty. For this purpose our improved dental cup has an extra corrugated or "bellows" portion which can be compressed after the impression cup is fully seated on the tooth, thus forcing the impression material into all of the tooth areas. This results in a more detailed, accurate and complete impression.

With the usual dental cup there are no projections to grasp with the finger tips for removal. This results in squeezing the band during removal, with possible distortion of the imprint. Another object is to aid removal of the cup after the impression material gels, without distortion of the housing. The corrugated portion of our cup becomes more rigid when compressed. It can be readily grasped by the finger tips. Even a soft dental impression material can be removed without squeezing and distorting the cup. The same is true of more rigid impression materials such as thermoplastic compounds and waxes. The usual dental cup is not as rigid occlusally upon removal as is ours, because it does not have the compressed corrugations, and these add rigidity.

Another object is to prevent slippage between the inner wall of the band and the impression material itself, when removing the cup. The impression material must adhere tightly to the inner wall of the cup for the impression to be accurate. This is especially difficult when using such fluid impression materials such as the silicones and rubbers, because they do not harden to a truly rigid mass.

In the usual dental cup no textured areas exist to grip the impression materials. The impression material can slip or pull away from the inner wall of the cup if the prepared tooth structure has undercut areas. Sometimes an adhesive is preliminarily applied to the inside of the band. In our cup the collapsed corrugated upper portion of the cup serves as an undercut area and locks the silicone or rubber material when it sets.

In accordance with a further feature and object of the invention, the side wall of the cup body itself may be roughened, textured, dimpled, or serrated to better bond the impression material to the cup. In accordance with another object, the lower end of the bellows portion is preferably small enough to act as a stop against the tooth, thereby preventing the open lower edge of the cup from being pushed too far down and possibly injuring the gingiva therebeneath.

In accordance with still another feature and object, the closed top of the bellows is provided with one or more holes which act as vents. The thumb of the dentist may be placed over the vent holes whenever desired during the compression of the bellows, to obtain maximum pressure. The vents facilitate the escape of air bubbles when initially loading the cup, and again later after release of thumb pressure. The vent permits the material to come back to atmospheric pressure after initial compression. Sometimes the dentist may himself pierce the side wall near the top of the cup to provide additional vent holes, as when the gingival seal at the bottom of the cup is particularly tight. The hydraulic pressure is still adequate. Moreover, the passage of some impression material through a vent acts further to anchor the impression material in the cup, and constitutes another means to discourage slippage or distortion caused by adherence of the impression material to the prepared tooth.

Another general object is to apply the foregoing features and improvements to a dental tray as well as a dental cup. Such a tray is relatively rigid; is wider than the teeth at the bottom; and has open ends. It needs a seal, which usually is wax or a silicone rubber applied along the sides and around the two ends. Such a seal is preliminarily shaped by pushing the tray and sealing material downward in position, before loading the tray with impression material. The main improvement, as before, is the provision of a compressible bellows forming an upward extension of the body, and in this case the body is rigid while the bellows is readily bendable. They are accordingly made of different materials and are secured together, or if made integrally out of thin material, the side walls of the tray are reversely folded to provide double side walls of adequate stiffness.

To accomplish the foregoing objects and such other objects as will hereinafter appear, our invention resides in the housing elements and their relation one to another, as are hereinafter more particularly described in the following specification. The specification is accompanied by drawings in which:

FIG. 1 is a plan view showing an impression cup applied to a tooth prepared to receive a crown;

FIGS. 1A and 1B show modifications;

FIG. 2 is a partially sectioned elevation;

FIG. 3 is a view similar to FIG. 2 but showing the bellows compressed;

FIG. 4 is an elevation of another impression cup in which the bellows is helically grooved;

FIG. 5 is a section through an impression cup in which the body and bellows are made of different materials secured together;

FIG. 6 is a fragmentary section through another impression cup made of two different materials;

FIG. 7 is a perspective view of still another impression cup;

FIG. 8 is a plan view of sectional dental trays;

FIG. 9 is a similar view showing a full tray;

FIG. 10 is a perspective view of a sectional tray having reversely folded side walls;

FIG. 11 is a section taken approximately on the line 11—11 of FIG. 10; and

FIG. 12 is a section taken approximately on the line 12—12 of FIG. 9.

Referring to the drawing, and more particularly to FIGS. 1 and 2, the prepared tooth is shown at 12. In this case it is prepared to receive a crown, but our improvement is similarly applicable to a tooth prepared to receive an inlay. The dental cup comprises a body 14 (FIG. 2), and a compressible bellows 16 which forms an upward extension of the body 14. The bellows 16 is made of thin readily bendable material, so that it is downwardly compressible to force impression material 18 into the body portion 14.

This is shown by the change from FIG. 2 to FIG. 3 in which the bellows 16 has been compressed, forcing the impression material around the prepared tooth 12, with excess escaping as indicated at 20.

In the example shown the body 14 and bellows 16 are made integrally out of thin metal. The body 14 is made available in different sizes (diameters) just as is the case with conventional impression bands and cups. The appropriate size is selected, and the lower end is trimmed to fit the contour of the gingival margins of the tooth, this being indicated by the broken line 22. The lowest corrugation or groove 24 of the bellows may be made deep enough to engage the prepared tooth 12, thus limiting the downward movement of the body 14 and so avoiding possible injury to the gingival tissue.

The top 26 of the bellows may have one or more vent holes 28. These facilitate escape of air when initially loading the cup, and may be closed when desired by the thumb of the dentist when compressing the bellows. If desired, some impression material may be permitted to escape through the vent, as shown at 29, thus additionally anchoring the impression material in the cup. It is also anchored by the corrugation of the bellows. The side walls of the body 14 may be textured, roughened, dimpled, or serrated to additionally anchor the impression material in the cup, and one form of textured or dimpled side wall is suggested in FIGS. 2 and 3 of the drawing.

It will be evident from inspection of FIG. 3 that the compressed bellows facilitates grasping and removal of the impression cup after the impression material has jelled or set. It also stiffens the impression cup against possible deformation while gripping and removing the same.

It will be understood by those familiar with dental practice that a model of the prepared tooth 12 is made from the impression in the impression cup. A wax "bite" of the patient also is taken by the dentist, and plaster is poured therein to obtain the general relationship of the prepared tooth to the other teeth. Both the opposing arch and the arch being worked on are mounted in a dental articulator, and the model of the prepared tooth is put in the appropriate plaster arch. Wax is placed around the model of the prepared tooth, and is carved and shaped by the dentist to the desired external tooth shape, in relation to the adjacent teeth. The resulting wax crown is removed, and the desired gold crown is cast by the "lost wax" process. If there is to be a porcelain face or a porcelain shell, the wax model of the crown is appropriately modified before casting the gold crown.

In this description it is assumed for convenience that the dentist is working on a lower tooth, and the cup is said to have an open bottom, with the bellows forming an upward extension, and being downwardly compressible, but it will be understood that this terminology is used merely for convenience, and that when working on an upper tooth the cup is inverted, the body then having an open top, and the bellows constituting a downward extension of the body, and being upwardly compressible.

Referring now to FIG. 4 of the drawing, the body 30 again has an integral bellows 32, but the bellows differs in two respects from that previously shown. One is that the bellows is larger in diameter than the body, and another is that the corrugation of the bellows is helical rather than annular. Either change may be used alone, that is, the bellows may be helical without an increase in diameter, or the bellows may be increased in diameter without being helical. The increase in diameter is convenient when forming the grooves by certain manufacturing techniques. It also facilitates removal of the cup, by providing a better grasp when removing the cup from the prepared tooth. It facilitates such removal whether performed manually, or performed by interlocking it into an over impression made of any suitable material, which may be elastomeric or thermosetting or plaster.

However, in many cases the bellows should not exceed the diameter of the cup in the mesio-distal direction, but may and preferably should exceed the diameter of the cup in the buccal-lingual or labial-lingual direction.

Such a modification is shown in FIG. 1A, which shows the cup in plan, the body being indicated by the dotted circle 102, and the bellows by the ellipse 104. This view corresponds to that shown at 16 in FIG. 1, and is similarly oriented, that is the adjacent teeth are assumed to be at the left and right. The cup 102 is initially cylindrical but is shaped by the dentist to fit the shape of the prepared tooth, which in many cases may be nearly rectangular.

Another variant form is shown in FIG. 1B, in which the cylindrical body 112 is surmounted by an elliptical bellows 114, the latter being larger in diameter than the body 112 in one direction but smaller in diameter than the body 112 in the other direction. Here again the cup would be oriented with the short axis of the bellows in the mesio-distal direction, thereby safely avoiding possible interference with the adjacent teeth. However, the projection of the bellows on its long axis is conveniently located to facilitate grasp for removal.

FIG. 5 illustrates an impression cup in which the body 34 is made of one material, typically metal, and the bellows 36 is made of another material, for example, a flexible plastic such as polyethylene or polypropylene. The bellows could even be made out of a prepared paper treated with plastic. In FIG. 5 the bellows is secured to the body by cementing the same together at the overlapping surfaces 38. Vent holes are indicated at 40.

In FIG. 6 the body 42 and bellows 44 again are made of different materials but in this case the bellows 44 is small enough in diameter to pass through the top of the body 42, and the bottom of the bellows has a flange 46 of increased diameter which is anchored beneath the inturned flange 48 at the top of the body 42. These provide a mechanical interlock in addition to the use of an adhesive bond between the flanges 46 and 48.

Still another form of impression cup is illustrated in FIG. 7, in which the body 50 carries a bellows 52 which in this case has only a single groove 54, but which nevertheless is compressible as previously described. Here again a vent hole 56 preferably is provided. FIG. 7 also illustrates the addition of a so-called "band size number" at 58. This is of convenience when selecting a cup of correct size from an assortment of cups. Morevor, the location of the number at 58 may be used to indicate a proper or desired orientation of the cup on the prepared tooth, so that it will always be applied to the tooth in the same orientation. The number may be applied to the top near the one edge, instead of to the side wall.

The invention is applicable not only to an impression cup but also to an impression tray. FIG. 8 shows a set of three impression trays 60, 62, and 64, while FIG. 9 shows a single full tray 66, the latter including a handle 68. In each case the tray differs from a conventional tray in having a compressible bellows 70, 72, 74, or 76, respectively, which forms an upward extension of the body of the tray, and which is made of thin bendable material so that it is downwardly compressible. The construction is also shown in vertical section in FIG. 12, in which tray 66 is made of relatively thick rigid material, while the bellows 76 is made of thin flexible material. The parts are secured together in any desired manner. In the illustrated example the parts are adhesively bonded together at 78, and the dimensioning of the parts is such that the flanges of the body and the bellows interlock, thus anchoring the parts mechanically in addition to the adhesive bond. The body 66 may be made of rigid metal, and the bellows 76 may be made of a very thin flexible metal, or of a non-metallic material such as one of the known flexible plastics.

It is also possible to draw the bellows and tray integrally out of a single piece of thin sheet metal, and such a construction is shown in FIGS. 10 and 11, but in such case the metal at the open bottom edge 80 of the tray is reversely folded inward and upward as shown at 82, to provide double side walls of adequate stiffness. With this construction the metal is preliminarily drawn to form a non-corrugated bellows portion 84, and a tray consisting of a top wall 86 and a deep side wall 88. The part 82 at this time is a downward continuation of the part 88. The corrugations 90 are formed subsequently. The part 82 may be roughened, dimpled or perforated, before being reversely folded. As illustrated, it has perforations 96.

Because the tray is wide at the bottom, and has open ends, it is necessary to seal the tray, and for this purpose a sealing material such as wax or silicone rubber is preliminarily placed along the two sides and around the two ends of the tray. At this time the tray has not yet been loaded with the impression material shown at 92 in FIG. 11. The tray is pushed down to shape the seal, and is then removed and inspected, and excess material is cut away. In FIG. 11 the seal is shown at 98. The tray then is loaded with the regular impression material 92, and is replaced in the mouth, somewhat as shown in FIG. 11, following which the bellows is compressed to force the impression material into place, where it is allowed to set a few minutes before the tray and impression material are removed. The same procedure applies to the tray of FIG. 12.

Vent holes may be provided, as shown at 94. However, they are not important in a tray as they are in a cup, because in a cup they aid when first loading the cup, by releasing trapped air. A tray is so open that it is readily loaded without vent holes.

The impression cup shown in FIGS. 1 through 7 may be made of thin annealed aluminum or copper. It is made in varying diameters or sizes to accommodate variations in tooth size. The side wall of the body is made long enough to accommodate the maximum length of a prepared tooth. The smallest diameter that will fit the prepared tooth is selected, and the open end is trimmed to give it the contour of the gingival margins of the prepared tooth. The lower end of the bellows may itself act as an occlusal stop, as shown in FIGS. 2 and 3. The inner surface of the cup may be coated with bonding agent, but this is not essential if the wall is roughened or textured for the same purpose. The cup then is filled with a premixed elastomeric impression material. The vent hole permits escape of air beneath the material being loaded into the cup. The filled cup then is placed back in proper position on the prepared tooth, whereupon the bellows is compressed, thus providing an added pressure which assures the displacement of entrapped air, saliva, or blood, and results in a very accurate impression.

The body of the cup is sometimes referred to as being cylindrical, but in fact the sectional shape may be a somewhat rounded rectangle, or it may be oval, to correspond to the tooth shape.

The impression material may be a silicone material or a thiokol rubber, as examples.

After the bellows has been compressed it serves to rigidify the cup, and it serves as a finger grip which facilitates its removal from the prepared tooth. This minimizes distortion during removal. The bellows also helps anchor the material in the housing.

Another method of removing the compressed cup (or several of them) is to take an overall impression around the collapsed cup (or cups) after the impression material in the cup has set. The undercut areas of the collapsed bellows are locked in the overall impression material, and they are all removed together. This provides an undistroted imprint of the prepared tooth (or teeth) plus the surrounding teeth and tissue area. With vent holes the escaped impression material on top of the bellows easily adheres to the similar material used for the overall impression, and this additional bonding enables the dental impression to be removed intact.

It is believed that the consruction of our improved dental impression cups and trays, as well as the method of use and the advantages of the same, will be apparent from the foregoing detailed description. It will also be apparent that while we have shown and described the invention in several preferred forms, changes may be made without departing from the scope of the invention, as sought to be defined in the following claims. In the claims the term "impression housing" is intended to be generic to either a cup or a tray.

We claim:

1. A dental impression housing comprising a body having side walls and an open bottom, and a compressible bellows forming an upward extension of said body, said bellows being made of a thin readily bendable material, the bellows being downwardly compressible to force impression material into the body portion.

2. A dental impression housing comprising a body having side walls and an open bottom, and a compressible bellows forming an upward extension of said body and providing a substantially closed top for the same, said bellows being made of a thin readily bendable material, the bellows being downwardly compressible to force impression material into the body portion.

3. A dental impression housing comprising a body having side walls and an open bottom, and a compressible bellows forming an upward extension of said body and providing a substantially closed top for the same, said bellows being made of a thin readily bendable material, the bellows being downwardly compressible to force impression material into the body portion, and the side walls of the body being roughened to help hold the said impression material therein.

4. A dental impression housing comprising a body having side walls and an open bottom, and a compressible bellows forming an upward extension of said body and providing a substantially closed top for the same, said bellows being made of a thin readily bendable material, and having one or more vent holes in its closed top, the bellows being downwardly compressible to force impression material into the body portion.

5. A dental impression housing comprising a body having side walls and an open bottom, and a compressible bellows forming an upward extension of said body and providing a substantially closed top for the same, said bellows being made of a thin readily bendable material, and having one or more vent holes in its closed top, the bellows being downwardly compressible to force impression material into the body portion, and the side walls of the body being roughened to help hold the said impression material therein.

6. A dental impression housing as defined in claim 1 in which the body is dimensioned to act as an impression band or cup which is adapted to be used around a single tooth.

7. A dental impression housing as defined in claim 3 in which the body is dimensioned to act as an impression band or cup which is adapted to be used around a single tooth.

8. A dental impression housing as defined in claim 4 in which the body is dimensioned to act as an impression band or cup which is adapted to be used around a single tooth.

9. A dental impression housing as defined in claim 1 in which the body and the bellows are made integrally, and in which the body is dimesnioned to act as an impression band or cup which is adapted to be used around a single tooth.

10. A dental impression housing as defined in claim 3 in which the body and the bellows are made integrally, and in which the body is dimensioned to act as an impression band or cup which is adapted to be used around a single tooth.

11. A dental impression housing as defined in claim 4 in which the body and the bellows are made integrally, and in which the body is dimensioned to act as an impression band or cup which is adapted to be used around a single tooth.

12. A dental impression housing as defined in claim 1 in which the body and the bellows are made of different materials, and in which the body is shaped like a dental impression tray and is made of a relatively heavy stiff material, and in which the bellows is made of a thin compressible material, the body and bellows being secured together for use as a single structure.

13. A dental impression housing as defined in claim 3 in which the body and the bellows are made of different materials, and in which the body is shaped like a dental impression tray and is made of a relatively heavy stiff material, and in which the bellows is made of a thin compressible material, the body and bellows being secured together for use as a single structure.

14. A dental impression housing as defined in claim 4 in which the body and the bellows are made of different materials, and in which the body is shaped like a dental impression tray and is made of a relatively heavy stiff material, and in which the bellows is made of a thin compressible material, the body and bellows being secured together for use as a single structure.

15. A dental impression housing as defined in claim 1 in which the body and the bellows are made integrally out of a relatively thin metal, and in which the body is shaped and dimensioned like a dental impression tray, and in which the metal at the open bottom edge of the tray is reversely folded inward and upward to provide double side walls of adequate stiffness for use as a dental tray.

16. A dental impression housing as defined in claim 3 in which the body and the bellows are made integrally out of a relatively thin metal, and in which the body is shaped and dimensioned like a dental impression tray, and in which the metal at the open bottom edge of the tray is reversely folded inward and upward to provide double side walls of adequate stiffness for use as a dental tray.

17. A dental impression housing as defined in claim 4 in which the body and the bellows are made integrally out of a relatively thin metal, and in which the body is shaped and dimensioned like a dental impression tray, and in which the metal at the open bottom edge of the tray is reversely folded inward and upward to provide double side walls of adequate stiffness for use as a dental tray.

18. A dental impression housing as defined in claim 1 in which the bellows is elliptical in plan, and in which the short axis is no greater than the diameter of the body, and in which the long axis is greater than the diameter of the body.

References Cited

UNITED STATES PATENTS

| | | | |
|---|---|---|---|
| 2,428,773 | 10/1947 | Beresin et al. | 32—17 |
| 3,056,205 | 10/1962 | Ennor | 32—17 |

FOREIGN PATENTS

| | | |
|---|---|---|
| 1,387,615 | 12/1964 | France. |

RICHARD A. GAUDET, *Primary Examiner.*

J. W. HINEY, *Assistant Examiner.*